(12) United States Patent
Lee et al.

(10) Patent No.: US 12,430,588 B2
(45) Date of Patent: Sep. 30, 2025

(54) COMPUTER SYSTEM FOR INFERRING UNCERTAINTY OF HUMAN AND METHOD THEREOF

(71) Applicant: Korea Advanced Institute of Science and Technology, Daejeon (KR)

(72) Inventors: Sang Wan Lee, Daejeon (KR); Yujin Cha, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 1062 days.

(21) Appl. No.: 17/404,156

(22) Filed: Aug. 17, 2021

(65) Prior Publication Data

US 2022/0172125 A1 Jun. 2, 2022

(30) Foreign Application Priority Data

Dec. 2, 2020 (KR) .................. 10-2020-0166376

(51) Int. Cl.
  *G06N 20/20* (2019.01)
  *G06F 18/21* (2023.01)
  *G06F 18/214* (2023.01)
  *G06F 18/40* (2023.01)

(52) U.S. Cl.
  CPC ........... *G06N 20/20* (2019.01); *G06F 18/214* (2023.01); *G06F 18/217* (2023.01); *G06F 18/41* (2023.01)

(58) Field of Classification Search
  CPC ........ G06N 20/20; G06N 3/045; G06N 3/047; G06N 3/08; G06F 18/214; G06F 18/217; G06F 18/41; G06V 10/774; G06V 10/776; G06V 10/7788
  See application file for complete search history.

(56) References Cited

U.S. PATENT DOCUMENTS

| | | | |
|---|---|---|---|
| 2016/0104070 A1* | 4/2016 | Eslami | G06N 7/01 706/12 |
| 2020/0320354 A1* | 10/2020 | Ghesu | G06F 18/2155 |
| 2021/0279644 A1* | 9/2021 | Givental | G06F 18/2321 |
| 2021/0312323 A1* | 10/2021 | Arnold | G06N 20/20 |

(Continued)

FOREIGN PATENT DOCUMENTS

| | | | | |
|---|---|---|---|---|
| AU | 2019251362 B2 * | 9/2024 | | G06N 3/084 |
| KR | 20200075071 A | 6/2020 | | |
| WO | WO-2020068784 A1 * | 4/2020 | | G06N 3/045 |

OTHER PUBLICATIONS

Lakshminarayanan et al., "Simple and Scalable Predictive Uncertainty Estimation using Deep Ensembles", published in 2017, 31st Conference on Neural Information Processing Systems (NIPS 2017), Long Beach, CA, USA, pp. 12 (Year: 2017).*

(Continued)

*Primary Examiner* — Chau T Nguyen (74) *Attorney, Agent, or Firm* — CHRISTENSEN O'CONNOR JOHNSON KINDNESS PLLC (57) ABSTRACT

Provided is a computer system and method for inferring a human uncertainty that may estimate a predictive uncertainty of a human about input data based on a proxy ensemble network configured for each individual human and may infer an uncertainty range including the predictive uncertainty for the human. The proxy ensemble network may be configured using uncertainty measurement values for the respective data items evaluated by the human.

9 Claims, 7 Drawing Sheets

(56) References Cited

U.S. PATENT DOCUMENTS

2022/0129707 A1* 4/2022 Jog .................. G06N 3/047

OTHER PUBLICATIONS

Lakshminarayanan et al., "Simple and Scalable Predictive Uncertainty Estimation using Deep Ensembles", published on Nov. 4, 2017, ARXIV ID: 1612.01474, pp. 15 (Year: 2017).*

Joost van Amersfoort et al., "Uncertainty Estimation Using a Single Deep Deterministic Neural Network," arXiv:2003.02037v2 [cs.LG] Jun. 29, 2020 (Jun. 29, 2020).

* cited by examiner

COMPUTER SYSTEM FOR INFERRING UNCERTAINTY OF HUMAN AND METHOD THEREOF

CROSS-REFERENCE TO RELATED APPLICATION

This application claims the priority benefit of Korean Patent Application No. 10-2020-0166376, filed on Dec. 2, 2020, in the Korean Intellectual Property Office, the disclosure of which is incorporated herein by reference in its entirety.

BACKGROUND

1. Field of the Invention

The following description of example embodiments relates to a computer system and method for inferring an uncertainty of a human.

2. Description of the Related Art

A human or a machine learning (ML) model generalizes to a concept or knowledge while acquiring data. However, since learnable data is finite, there is uncertainty when determining, for example, inferring unexperienced data. The uncertainty may be quantified as a "quantitative" value that depends on a learning subject and data. Through quantification of uncertainty, it is possible not only to advance knowledge of human and machine learning, but also to improve performance and reliability of a system in a wide range of applications that require knowledge inference, such as smart education and healthcare. However, in terms of handling the uncertainty, there are two major issues, interpretability and accessibility. The interpretability relates to a method of defining uncertainty. Here, the human may easily define uncertainty through self-evaluation (excellent interpretability). However, the machine learning model may have difficulty in defining uncertainty (poor interpretability). The accessibility relates to a method of calculating uncertainty about a dataset. Here, the machine learning model may easily calculate any data through sampling only if a calculation method is defined (excellent accessibility). However, the human may have difficulty in measuring uncertainty through sampling for each piece of large data (poor accessibility). Despite the wide application potential for human uncertainty, there are few alternatives or preceding studies that may overcome the low accessibility.

SUMMARY

Example embodiments are to improve poor accessibility of human uncertainty by inferring an individual uncertainty of a human using a simple and universally accessible proxy ensemble network. That is, the example embodiments learn an option (classification) and a level of confidence (uncertainty) reported by a specific human for specific data and predict the range of an option and uncertainty to be reported by the corresponding human for another data.

According to an aspect of example embodiments, there is provided a method performed by a computer system, the method including estimating a predictive uncertainty of a human about input data based on a proxy ensemble network configured for each individual human; and inferring an uncertainty range including the predictive uncertainty for the human.

According to an aspect of example embodiments, there is provided a computer system including a memory; and a processor configured to connect to the memory and to execute at least one instruction stored in the memory. The processor is configured to estimate a predictive uncertainty of a human about input data based on a proxy ensemble network configured for each individual human, and infer an uncertainty range including the predictive uncertainty for the human.

According to an aspect of example embodiments, there is provided a non-transitory computer-readable record medium storing instructions that, when executed by a processor, cause the processor to perform operations of estimating a predictive uncertainty of a human about input data based on a proxy ensemble network configured for each individual human; and inferring an uncertainty range including the predictive uncertainty for the human.

According to some example embodiments, a computer system may directly infer an uncertainty about unexperienced data for a specific human. That is, the computer system may infer the uncertainty about data that the specific human has not experienced based on a proxy ensemble network configured for the specific human. Here, the computer system may infer the uncertainty for the specific human with high accuracy by inferring the uncertainty using a reliable range.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The terminology used herein is for describing various example embodiments only, and is not to be used to limit the disclosure. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component, without departing from the scope of the disclosure.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Hereinafter, the example embodiments are described with reference to the accompanying drawings.

As learning subjects that perform self-improvement through learning, an artificial intelligence (AI) and a human require a measure to quantify what and how much the AI and the human know and what and how much the AI and the human do not know. The quantity measured by this measure is called an uncertainty. Understanding the uncertainty, it is possible to establish a strategy for determining a learning data candidate capable of maximizing learning efficiency or improving system imperfection.

In terms of handling the uncertainty, there are two considerations: how to interpret the uncertainty (interpretability) and how to measure the uncertainty according to a definition of interpretation (accessibility).

A method of interpreting an uncertainty in the latest AI algorithms represented by deep learning has been considered as a great challenge. Defining how to interpret the uncertainty in AI algorithms is difficult. However, once uncertainty interpretation criteria of AI are defined, the uncertainty of the algorithm can be easily measured for any data. According to recent studies, various methodologies have been proposed for the interpretation of uncertainty in AI algorithms, and related research fields are developing significantly. However, once uncertainty interpretation criteria of AI are defined, the uncertainty of an algorithm may be easily measured for any data. According to recent studies, various methodologies have been proposed for interpreting the uncertainty of AI algorithms and related research fields are significantly developing.

On the other hand, an issue of interpreting the uncertainty of a human is regarded as being easy compared to the AI algorithm since the human may subjectively interpret and report a degree of uncertainty the human feels about data being observed and this subjective interpretation has a high correlation with an objective uncertainty. However, despite such ease of interpretation, there is a great difficulty in measuring the human uncertainty. It is inefficient to verify the uncertainty through measurement of data of which uncertainty is to be evaluated. Alternatively, if a size of data increases, the measurement itself is impossible. Accordingly, there are limitations on immediate validation and application of uncertainty information. To overcome the limitations found in validating the human uncertainty, technology capable of replacing an issue of "measurement" of the human uncertainty with "inference."

According to research and related technology trend made so far, there is no technology for directly inferring the human uncertainty. The example embodiments relate to an idea of directly inferring the human uncertainty and the human uncertainty is based on the following characteristics.

A first characteristic refers to a human uncertainty behavior similar to a Bayesian neural network (BNN). The uncertainty of a model to be learned is classified into aleatoric uncertainty of data itself and epistemic uncertainty of the model. The uncertainty of the model observed from a random measurement appears by adding uncertainty within a specific range occurring in the uncertainty of the model to the uncertainty of the data itself. A total amount of uncertainty predicted in an arbitrary uncertainty measurement is a total sum of uncertainties predicted from the uncertainty of data and the uncertainty of the model.

A second characteristic is a likelihood of a model by the measured uncertainty. When measuring uncertainty about data for a specific human, a predictive uncertainty is equal to a total sum of uncertainties predicted by a behavioral parameter of the corresponding human and data uncertainty. Meanwhile, the outputtable range of data may be great or small and may be determined based on parameters of the BNN and data. If the outputtable range is large, it is highly likely to output a result different from a prediction, that is, a result with a low likelihood when generating output for data. However, if the outputtable range is small, it is highly likely to output a result close to a prediction, that is, a result with a high likelihood when generating output for data.

The example embodiments relate to an ensemble artificial neural network that may learn the distribution of entire uncertainty only with a one-time measurement without repeated measurements on data of which uncertainty is to be measured based on the aforementioned characteristics about the human uncertainty. Such ensemble technology employs research for modeling a human uncertainty function with a BNN and human-AI fusion engineering technology for simulating a virtual uncertainty distribution modeled with the BNN with a proxy ensemble network and is first technology that does not have a similar research case in the related art.

If an AI system assists a task performance in a way of estimating and compensating for the human uncertainty, work efficiency may be improved. In this case, task performance capability of a human may be improved and AI may repeat learning according to the improved task performance capability. This enables co-evolution of the human and the AI system in a task performance perspective.

An issue of measuring the uncertainty of AI has been evolved. However, dissimilar to the AI, there is significant difficulty in measuring the uncertainty of a human in terms of solving practical issues. According to example embodiments, the human uncertainty that is difficult to measure may be inferred within a reliable range.

According to example embodiments, there may be the following three characteristics. According to a first characteristic, a decision making based on human uncertainty demonstrates a behavioral pattern similar to a decision making of a Bayesian artificial neural network. According to a second characteristic, human perceptual uncertainty may be classified into aleatoric uncertainty of data itself and epistemic uncertainty of a cognitive system, as in the Bayesian artificial neural network. According to a third characteristic, although several repeated uncertainty measurements may be generally required for the same data to measure uncertainty in a Bayesian artificial neural network perspective, the example embodiments may infer the uncertainty range through learning of a likelihood even with a one-time measurement.

Figure 1:
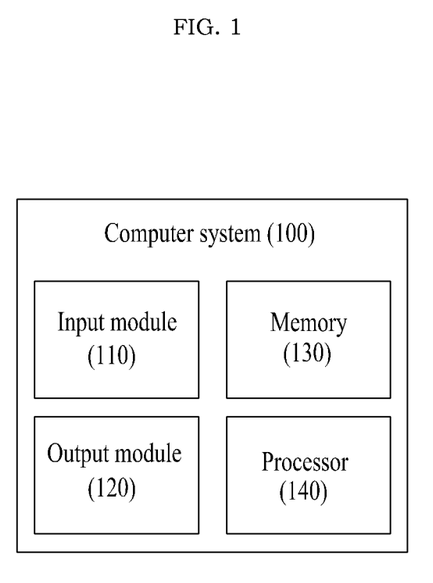
FIG. 1 is a diagram illustrating an example of a computer system according to example embodiments.
Figure 2:
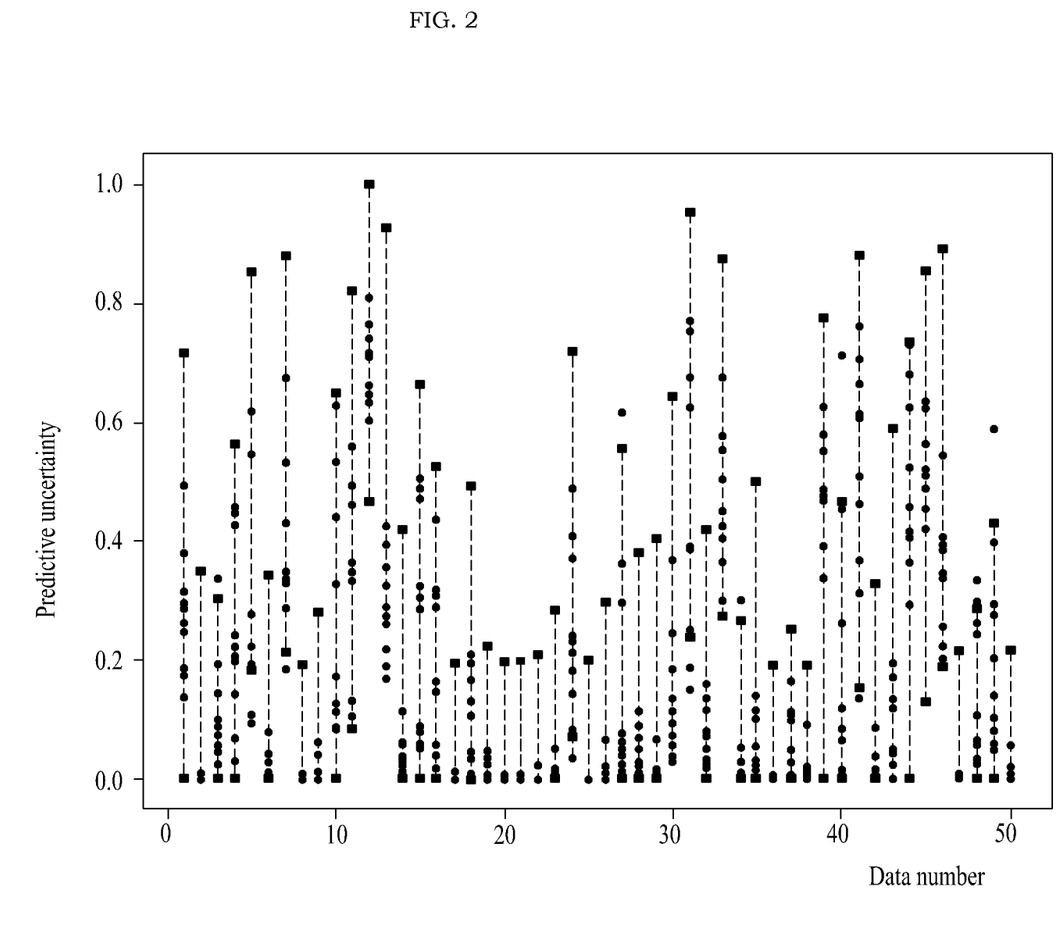
FIG. 2 illustrates an example of describing an operation characteristic of the computer system of FIG. 1.

FIG. 1 is a diagram illustrating an example of a computer system 100 according to example embodiments, and FIG. 2 illustrates an example of describing an operation characteristic of the computer system 100 of FIG. 1.

Referring to FIG. 1, the computer system 100 according to example embodiments may include at least one of an input module 110, an output module 120, a memory 130, and a processor 140. In an example embodiment, at least one of components of the computer system 100 may be omitted and at least one another component may be added. In an example embodiment, at least two of components of the computer system 100 may be implemented as a single integrated circuit. Here, the computer system 100 may include at least one apparatus, for example, at least one of at least one server and at least one electronic device. In an example embodiment, when the computer system 100 includes a plurality of apparatuses, the components of the computer system 100 may be configured in one of the apparatuses or may be configured in at least two of the apparatuses in a distributed manner.

The input module 110 may input a signal to be used for at least one component of the computer system 100. The input module 110 may include at least one of an input device configured to allow a user to directly input a signal to the computer system 100, a sensor device configured to detect an ambient change and to generate a signal, and a reception apparatus configured to receive a signal from an external device. For example, the input device may include at least one of a microphone, a mouse, and a keyboard. In an example embodiment, the input device may include at least one of a touch circuitry configured to sense a touch and a sensor circuitry configured to measure strength of a force generated by the touch.

The output module 120 may output information to an outside of the computer system 100. The output module 120 may include at least one of a display device configured to visually output information, an audio output device configured to output information as an audio signal, and a transmission apparatus configured to wirelessly transmit information. For example, the display device may include at least one of a display, a hologram device, and a projector. For example, the display device may be implemented as a touchscreen through assembly to at least one of the touch circuitry and the sensor circuitry of the input module 110. For example, the audio output device may include at least one of a speaker and a receiver.

According to an example embodiment, the reception apparatus and the transmission apparatus may be implemented as a communication module. The communication module may perform communication with an external device in the computer system 100. The communication module may establish a communication channel between the computer system 100 and the external device and may communicate with the external device through the communication channel. Here, the external device may include at least one of a satellite, a base station, a server, and another computer system. The communication module may include at least one of a wired communication module and a wireless communication module. The wired communication module may be connected to the external device in a wired manner and may communicate with the external device in the wired manner. The wireless communication module may include at least one of a near field communication module and a far field communication module. The near field communication module may communicate with the external device through a near field communication scheme. For example, the near field communication scheme may include at least one of Bluetooth, wireless fidelity (WiFi) direct, and infrared data association (IrDA). Here, the far field communication module may communicate with the external device over a network. For example, the network may include at least one of a cellular network, the Internet, and a computer network such as a local area network (LAN), and a wide area network (WAN).

The memory 130 may store a variety of data used by at least one component of the computer system 100. For example, the memory 130 may include at least one of a volatile memory and a nonvolatile memory. The data may include at least one program and input data or output data related thereto. A program may be stored as software including at least one instruction in the memory 130 and may include at least one of an operating system (OS), middleware, and an application.

The processor 140 may control at least one component of the computer system 100 by executing the program of the memory 130. Through this, the processor 140 may perform data processing or an operation. Here, the processor 140 may execute the instruction stored in the memory 130.

According to example embodiments, the processor 140 may estimate a predictive uncertainty of a corresponding human about input data based on a proxy ensemble network (PEN) configured for each individual human. Here, a different PEN may be independently configured for a different human. Here, a plurality of learning networks may be combined in the PEN. Through this, the processor 140 may infer an uncertainty range including the predictive uncertainty for the corresponding human.

To this end, the processor 140 may configure the PEN using uncertainty measurement values for the respective data items evaluated by an individual human. For example, a subject module may acquire uncertainty measurement values that are directly input from the respective humans. As another example, the subject module may estimate uncertainty measurement values based on a BNN. To this end, the BNN may be pretrained for a corresponding human. The processor 140 may generate a dataset in which the evaluated data items and uncertainty measurement values are matched, respectively. Here, the dataset may be classified into a first dataset and a second dataset. Also, the processor 140 may configure the PEN by learning the preset plurality of learning networks using the first dataset and by combining the learning networks. Also, the processor 140 may validate the PEN using the second dataset. Here, in response to a success in validating the PEN, the processor 140 may determine the PEN for the corresponding human.

According to example embodiments, the computer system 100 may predict the human uncertainty with high accuracy based on the PEN. For example, referring to FIG. 2, with respect to a plurality of, for example, 50 data items, predictive uncertainty (circular dot) predicted by the computer system 100 matches actual uncertainty (dotted line) with high accuracy. Here, the computer system 100 finally predicts the uncertainty range including the predictive uncertainty instead of predicting the predictive uncertainty. Therefore, the uncertainty predicted by the computer system 100 may match the actual uncertainty (dotted line) at a much higher level. That is, the computer system 100 may infer the uncertainty range for input data, for a human, and may predict the human uncertainty with high accuracy.

According to an example embodiment, the computer system 100 may infer the uncertainty range for medical images according to a specific physician. To this end, the computer system 100 may configure a PEN for the specific physician. Here, the computer system 100 may configure the PEN for the corresponding physician using the existing medical images. The computer system 100 may estimate a predictive uncertainty about a corresponding medical image based on the PEN. Through this, the computer system 100 may infer an uncertainty range including the predictive uncertainty for the specific physician.

Figure 3:
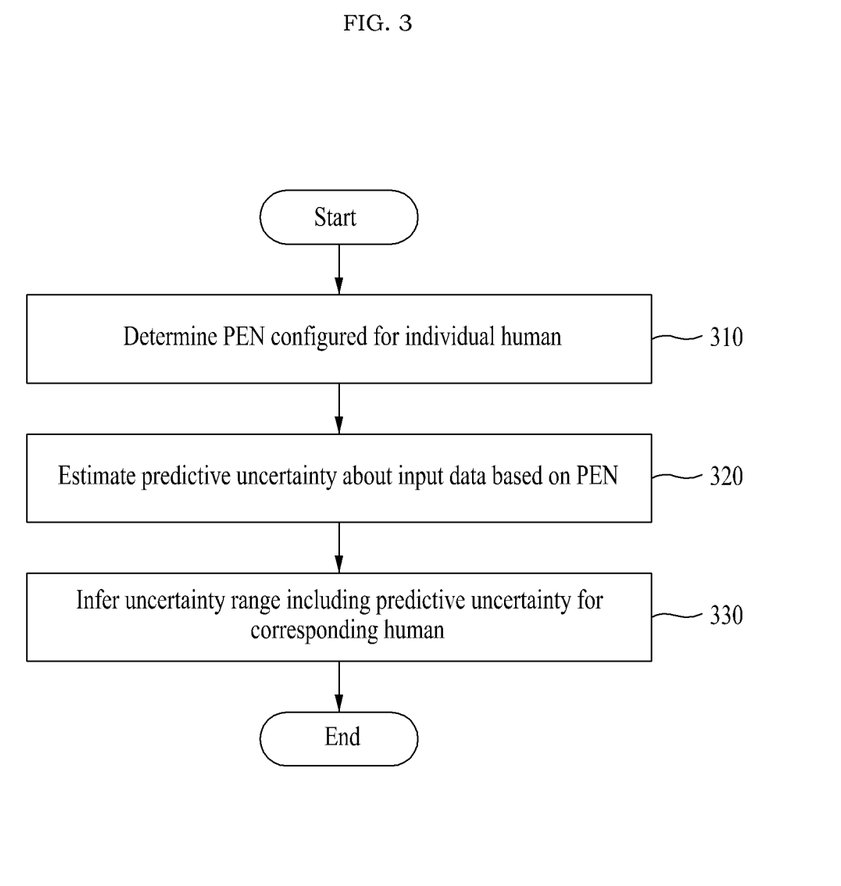
FIG. 3 is a flowchart illustrating an operation method of a computer system for inferring an uncertainty based on a proxy ensemble network according to example embodiments.

FIG. 3 is a flowchart illustrating an operation method of the computer system 100 for inferring an uncertainty based on a PEN according to an example embodiment.

Referring to FIG. 3, in operation 310, the computer system 100 may determine a PEN configured for an individual human. Here, a different PEN may be independently configured for a different human. Here, a plurality of learning networks may be combined in the PEN. Here, at least one of the learning networks may be modeled based on a structure of a BNN. Also, each of the learning networks may be learned for a corresponding human and combined into the PEN. A method of configuring a PEN for each human is described with reference to FIG. 4. In detail, the processor 140 may select a desired human and may determine a PEN configured for the selected human.

In operation 320, the computer system 100 may estimate a predictive uncertainty of the corresponding human about input data based on the PEN. Here, the processor 140 may estimate the predictive uncertainty about input data based on uncertainty of the PEN itself that occurs due to a likelihood that learns the PEN.

In operation 330, the computer system 100 may infer an uncertainty range including the predictive uncertainty for the corresponding human. For example, the processor 140 may predict the uncertainty range including the predictive uncertainty between a predetermined plurality of ranges. Through this, the processor 140 may infer the uncertainty range for the corresponding human.

Figure 4:
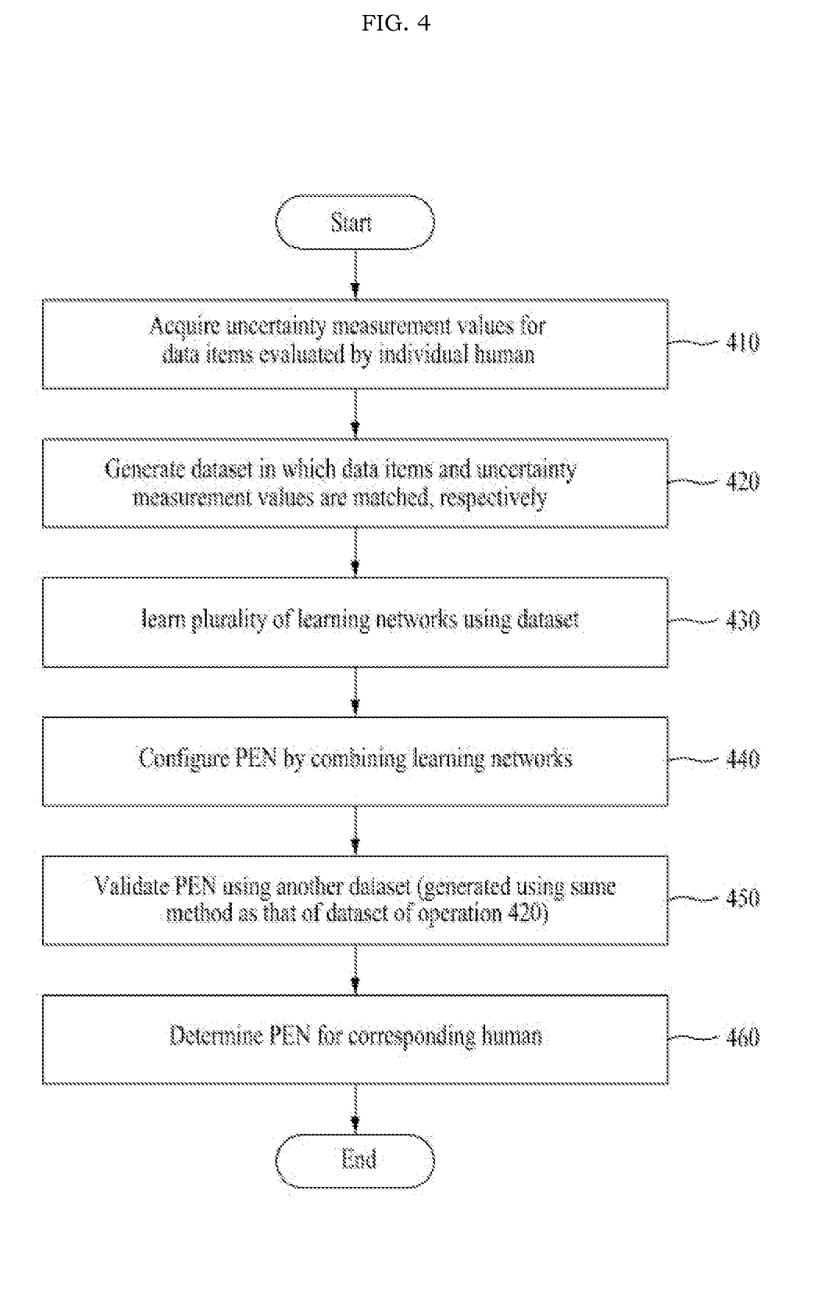
FIG. 4 is a flowchart illustrating an operation method of a computer system for learning a proxy ensemble network according to example embodiments.
Figure 5:
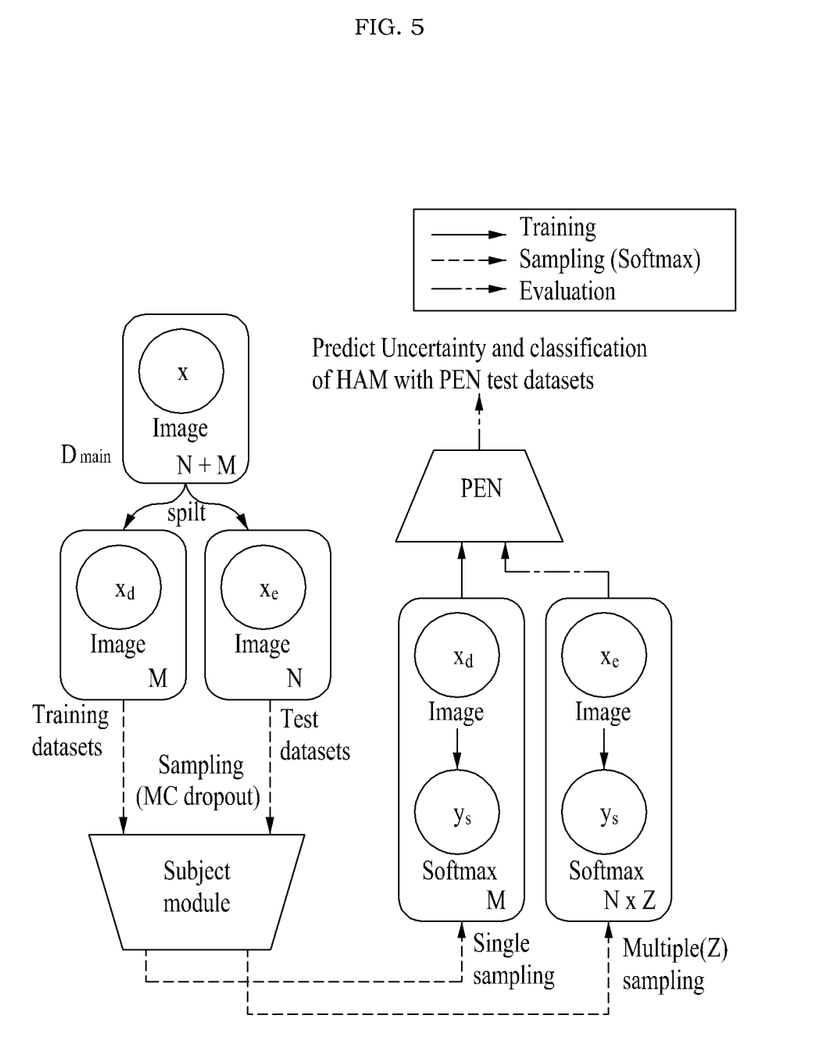
FIGS. 5, 6A, and 6B illustrate examples of describing the operation method of the computer system of FIG. 4.
Figure 6A:
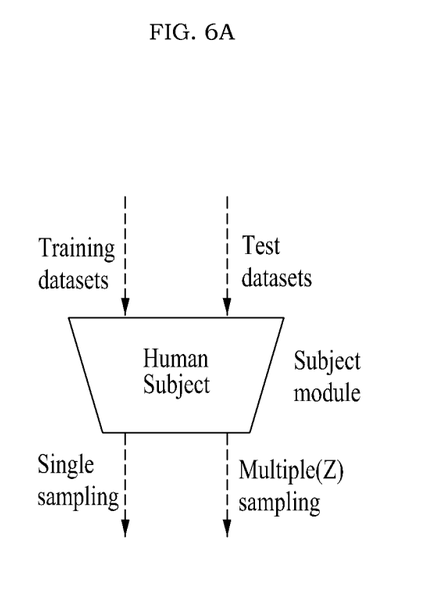
Figure 6B:
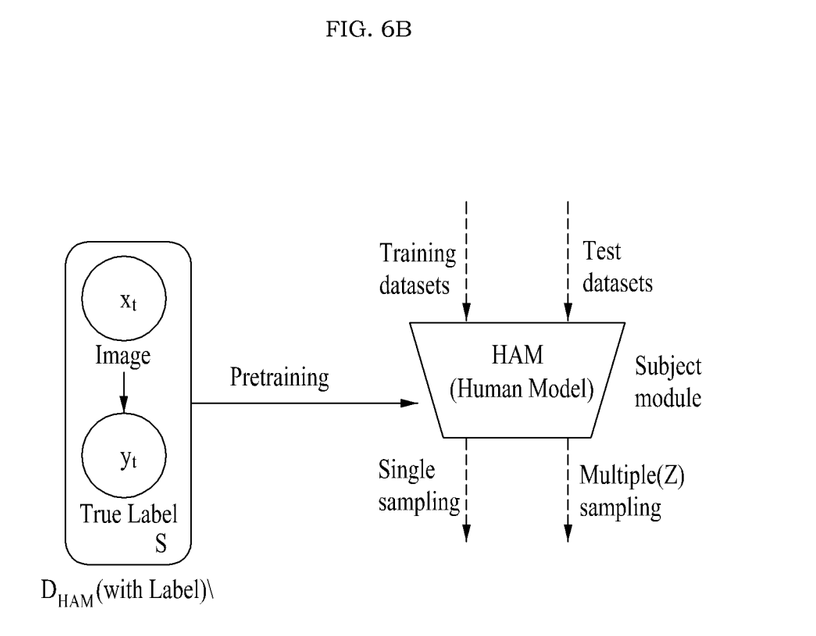

FIG. 4 is a flowchart illustrating an operation method of the computer system 100 for learning a PEN according to example embodiments, and FIGS. 5, 6A, and 6B illustrate examples of describing the operation method of the computer system 100 of FIG. 4.

Referring to FIG. 4, in operation 410, the computer system 100 may acquire uncertainty measurement values for data items (x) evaluated by an individual human. Referring to FIG. 5, the plurality of data items (x) may be prepared. For example, the data items (x) may include images. Here, the data items (x) may be classified into first data items ($x_P$) and second data items ($x_T$). Here, the second data items ($x_T$) may be used to validate a PEN and may be acquired using the same scheme as that of the first data items ($x_P$) and may also be acquired through multiple sampling. For example, the first data items ($x_P$) may be configured as $<x_1,y_1>$, $<x_2,y_2>$, $<x_3,y_3>$, and the second data items ($x_T$) may be configured as $<x_1,y_1>$, $<x_1,y_2>$, $<x_1,y_3>$, $<x_2,y_4>$, $<x_2,y_5>$, $<x_2,y_6>$. A subject module of each human may evaluate each of the data items (x) once and, as a result, the processor 140 may acquire the respective uncertainty measurement values for the respective corresponding data items (x). For example, referring to FIG. 6A, a subject module (human subject) may acquire uncertainty measurement values directly input from the respective humans. As another example, referring to FIG. 6B, a subject module (human model (HAM)) may include a BNN modeled for each human and may measure uncertainty measurement values based on the BNN. To this end, the BNN may be pretrained for a corresponding human. Through this, the processor 140 may acquire first uncertainty measurement values for the first data items ($x_P$) and second uncertainty measurement values for the second data items ($x_T$).

In operation 420, the computer system 100 may generate a dataset in which data items and uncertainty measurement values are matched, respectively. Here, the dataset may be classified into a first dataset and a second dataset. The processor 140 may generate the first dataset by matching the first data items ($x_P$) and the first uncertainty measurement values, respectively, and may generate the second dataset by matching the second data items ($x_T$) and the second uncertainty measurement values, respectively.

In operation 430, the computer system 100 may learn the preset plurality of learning networks using the dataset. Referring to FIG. 5, the processor 140 may learn the learning networks based on the data items (x) and output (ŷ) of the subject module. Here, the processor 140 may learn each of the learning networks using the first dataset.

In operation 440, the computer system 100 may configure the PEN by combining the learning networks. After learning the learning networks, the processor 140 may combine the learning networks. In this manner, the processor 140 may configure the PEN. Here, in association with a corresponding human, a likelihood of data used for PEN learning may be evaluated using the uncertainty of the PEN itself.

In operation 450, the computer system 100 may validate the PEN using the dataset. Referring to FIG. 5, the processor 140 may validate the PEN based on the data items (x) and output (ŷ) of the subject module. Here, the processor 140 may validate the PEN using the second dataset. Here, the processor 140 may detect confidence of the PEN. The processor 140 may compare the confidence to a preset reference value and may determine whether validation of the PEN is a success. That is, if the confidence is greater than or equal to the reference value, the processor 140 may detect a validation success of the PEN. On the contrary, if the confidence is less than the reference value, the processor 140 may detect a validation failure of the PEN.

In operation 460, the computer system 100 may determine the PEN for the corresponding human. Here, in response to the validation success of the PEN, the processor 140 may determine the PEN for the corresponding human. Meanwhile in response to the validation failure of the PEN, the processor 140 may not determine the PEN for the corresponding human. Here, the processor 140 may reperform the operation method of FIG. 4 to determine the PEN for the corresponding human.

According to example embodiments, the computer system 100 may directly infer uncertainty about unexperienced data for a specific human. That is, the computer system 100 may infer the uncertainty about data that the specific human has not experienced based on a PEN configured for the specific human. Here, the computer system 100 may infer the uncertainty for the corresponding human with higher accuracy by inferring the uncertainty using a reliable range.

The example embodiments may be applied or applicable to various fields. First, the example embodiments may be applicable to education and learning fields. Educational contents and fields capable of maximizing human learning are highly uncertain fields and thus, this technology may be applied to all the fields that require education and learning. For example, development of customized educational content or curriculum learning aims to enable a learner to most efficiently learn an insufficient area in a short period of time. This system may be directly applied to optimizing education and learning based on a user uncertainty by inferring uncertainty not by a content unit but by an expression vector included in content, based on machine learning. Second, the system may be used for an expert system. The system may be widely applied for recommendation and classification of experts and improvement of expert competence in fields that require precise recommendation of detailed experts according to a request of a consumer including expert education and learning. For example, a patient may be recommended a physician or a medical institution capable of providing a most appropriate medical service by estimating uncertainty of physician knowledge based on a type and a state of disease.

Marketability according to example embodiments is also expected to increase. The market in the field for education and learning optimization is growing significantly every year and the demand is expected to continue to grow. Although the demand for an education service capable of maximizing learning effect in a short period of time is very high, there is no service that provides a customized education by directly inferring a human knowledge uncertainty and high marketability is expected accordingly. Also, in the recent times in which areas of experts such as medical and legal services are differentiated in detail, the market that may appropriately recommend a detailed expert is expected to have great potential.

Systematic understanding and verification of human uncertainty is a new technical field that may have far-reaching ripple effect over the human life. The example embodiments may become fundamental technology that cause a great change in learning paradigm not only in a private education market but also in public and public education fields. Currently, technology for inferring a human uncertain has not been commercialized and epoch-making efficiency of, for example, learning and education, an expert education system, and the like may be improved by estimating the human uncertainty.

The method by the computer system 100 according to example embodiments may include operation 320 of estimating a predictive uncertainty about input data based on a PEN configured for each individual human and operation 330 of inferring an uncertainty range including the predictive uncertainty for the human.

According to example embodiments, the method may further include configuring the PEN using uncertainty measurement values for the respective data items evaluated by the human.

According to example embodiments, the configuring of the PEN may include operation 420 of generating a dataset in which the evaluated data items and the uncertainty measurement values are matched, respectively, operation 430 of learning a plurality of learning networks using the dataset, and operation 440 of configuring the PEN by combining the plurality of learning networks.

According to example embodiments, the dataset may be classified into a first dataset and a second dataset.

According to example embodiments, operation 430 of learning the learning networks may learn the learning networks using the first dataset.

According to example embodiments, the configuration of the PEN may further include operation 450 of validating the PEN using the second dataset, and operation 460 of determining the PEN for the human in response to a success in validating the PEN.

According to example embodiments, the PEN may be modeled based on a structure of a BNN.

According to example embodiments, a different PEN may be configured for a different human.

According to example embodiments, the human may perform evaluation on each of the data items once and, as a result thereof, the respective uncertainty measurement values may be acquired for the respective corresponding data items.

The computer system 100 according to example embodiments may include the memory 130 and the processor 140 configured to connect to the memory 130 and to execute at least one instruction stored in the memory 130.

According to example embodiments, the processor 140 may be configured to estimate a predictive uncertainty about input data based on a PEN configured for each individual human, and to infer an uncertainty range including the predictive uncertainty for the human.

According to example embodiments, the processor 140 may be configured to configure the PEN using uncertainty measurement values for the respective data items evaluated by the human.

According to example embodiments, the processor 140 may be configured to generate a dataset in which the evaluated data items and the uncertainty measurement values are matched, respectively, to learn a plurality of learning networks using the dataset, and to configure the PEN by combining the learning networks.

According to example embodiments, the processor 140 may be configured to classify the dataset into a first dataset and a second dataset, and to learn the learning networks using the first dataset.

According to example embodiments, the processor 140 may be configured to validate the PEN using the second dataset, and to determine the PEN for the human in response to a success in validating the PEN.

According to example embodiments, the PEN may be modeled based on a structure of a BNN.

According to example embodiments, a different PEN may be configured for a different human.

According to example embodiments, the human may perform evaluation on each of the data items once and, as a result thereof, the respective uncertainty measurement values may be acquired for the respective corresponding data items.

The systems and/or apparatuses described herein may be implemented using hardware components, software components, and/or a combination thereof. For example, a processing device and components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. Here, the media may be to continuously store a computer-executable program or to temporarily store the same for execution or download. Also, the media may include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of program instructions include both machine code, such as produced by a compiler, and files containing higher level code that may be executed by the computer using an interpreter.

The terms used herein are used to explain specific embodiments and are not construed to limit the disclosure and should be understood to include various modifications, equivalents, and/or substitutions of the example embodiments. In the drawings, like reference numerals refer to like components throughout the present specification. The singular forms "a," "an," and "the" are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe various components and the components should not be limited by the terms. The terms are simply used to distinguish one component from another component. When a component, for example, a first component, is described to be "(functionally or communicatively) connected to" or "accessed to" another component, for example, a second component, the component may be directly connected to the other component or may be connected through still another component, for example, a third component.

The term "module" used herein may include a unit configured as hardware, software, or firmware, and may be interchangeably used with the terms "logic," "logic block," "part," "circuit," etc. The module may be an integrally configured part, a minimum unit that performs at least function, or a portion thereof. For example, the module may be configured as an application-specific integrated circuit (ASIC).

According to the example embodiments, each of the components (e.g., module or program) may include a singular object or a plurality of objects. According to the example embodiments, at least one of the components or operations may be omitted. Alternatively, at least one another component or operation may be added. Alternatively or additionally, a plurality of components (e.g., module or program) may be integrated into a single component. In this case, the integrated component may perform one or more functions of each of the components in the same or similar manner as it is performed by a corresponding component before integration. According to the example embodiments, operations performed by a module, a program, or another component may be performed in sequential, parallel, iterative, or heuristic manner. Alternatively, at least one of the operations may be performed in different sequence or omitted. Alternatively, at least one another operation may be added.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method performed by a computer system, the method comprising:

configuring a plurality of proxy ensemble neural networks for a plurality of individual humans, respectively, such that a different proxy ensemble neural network is configured for a different individual human;

estimating a predictive uncertainty of an individual human about input data items evaluated by the individual human based on a proxy ensemble neural network configured for the individual human; and inferring an uncertainty range comprising the predictive uncertainty for the individual human, wherein the configuring comprises:

configuring the proxy ensemble neural network for the individual human using uncertainty measurement values for the data items evaluated by the individual human, wherein the configuring of the proxy ensemble neural network for the individual human comprises:

generating a dataset in which the evaluated data items and the uncertainty measurement values are matched, respectively;

learning each of a predetermined number of learning networks using the dataset; and configuring the proxy ensemble neural network for the individual human by combining the learning networks, wherein the learning of said each of the learning networks comprises:

learning a different range of the dataset for said each of the learning networks.

2. The method of claim 1, wherein the dataset is classified into a first dataset and a second dataset, and wherein the learning of the learning networks comprises learning the learning networks using the first dataset.

3. The method of claim 2, wherein the configuring of the proxy ensemble neural network further comprises:

validating the proxy ensemble neural network using the second dataset; and determining the proxy ensemble neural network for the individual human in response to a success in validating the proxy ensemble neural network.

4. The method of claim 1, wherein the individual human performs evaluation on each of the data items once and, as a result thereof, the respective uncertainty measurement values are acquired for the respective corresponding data items.

5. A computer system comprising:

a memory; and a processor configured to connect to the memory and to execute at least one instruction stored in the memory, wherein the processor is configured to configure a plurality of proxy ensemble neural networks for a plurality of individual humans, respectively, such that a different proxy ensemble neural network is configured for a different individual human, estimate a predictive uncertainty of an individual human about input data items evaluated by the individual human based on a proxy ensemble neural network configured for the individual human, and infer an uncertainty range comprising the predictive uncertainty for the individual human, wherein the processor is configured to:

configure the proxy ensemble neural network for the individual human using uncertainty measurement values for the data items evaluated by the individual human, wherein the processor configures the proxy ensemble neural network for the individual human by:

generating a dataset in which the evaluated data items and the uncertainty measurement values are matched, respectively;

learning each of a predetermined number of learning networks using the dataset; and configuring the proxy ensemble neural network for the individual human by combining the learning networks, wherein the learning of said each of the learning networks comprises:

learning a different range of the dataset for said each of the learning networks.

6. The computer system of claim 5, wherein the processor is configured to classify the dataset into a first dataset and a second dataset, and learn the learning networks using the first dataset.

7. The computer system of claim 6, wherein the processor is configured to validate the proxy ensemble neural network using the second dataset, and determine the proxy ensemble neural network for the individual human in response to a success in validating the proxy ensemble neural network.

8. The computer system of claim 5, wherein the individual human performs evaluation on each of the data items once and, as a result thereof, the respective uncertainty measurement values are acquired for the respective corresponding data items.

9. A non-transitory computer-readable record medium storing instructions that, when executed by a processor, cause the processor to perform operations of:

configuring a plurality of proxy ensemble neural networks for a plurality of individual humans, respectively, such that a different proxy ensemble neural network is configured for a different individual human;

estimating a predictive uncertainty of an individual human about input data items evaluated by the individual human based on a proxy ensemble neural network configured for the individual human; and inferring an uncertainty range comprising the predictive uncertainty for the individual human, wherein the configuring comprises, configuring the proxy ensemble neural network for the individual human using uncertainty measurement values for the data items evaluated by the individual human, wherein the configuring of the proxy ensemble neural network for the individual human comprises:

generating a dataset in which the evaluated data items and the uncertainty measurement values are matched, respectively;

learning each of a predetermined number of learning networks using the dataset; and configuring the proxy ensemble neural network for the individual human by combining the learning networks, wherein the learning of said each of the learning networks comprises:

learning a different range of the dataset for said each of the learning networks.

* * * * *